Feb. 15, 1927.

W. BLAKE

ANTIFRICTION BEARING

Filed March 26, 1924

1,617,700

INVENTOR:
Walter Blake,
BY
Arthur B Jenkins,
ATTORNEY.

Patented Feb. 15, 1927.

1,617,700

UNITED STATES PATENT OFFICE.

WALTER BLAKE, OF HARTFORD, CONNECTICUT.

ANTIFRICTION BEARING.

Application filed March 26, 1924. Serial No. 702,163.

My invention relates more especially to that class of bearings in which rolling elements are placed between relatively rotatable bodies, and an object of my invention, among others, is to provide a device of this class that shall be extremely simple and inexpensive as to its construction and particularly efficient as to its operation.

One form of an anti-friction bearing embodying my invention and in the construction and use of which the objects herein set out, as well as others, may be attained, is illustrated in the accompanying drawings, in which—

Figure 1:
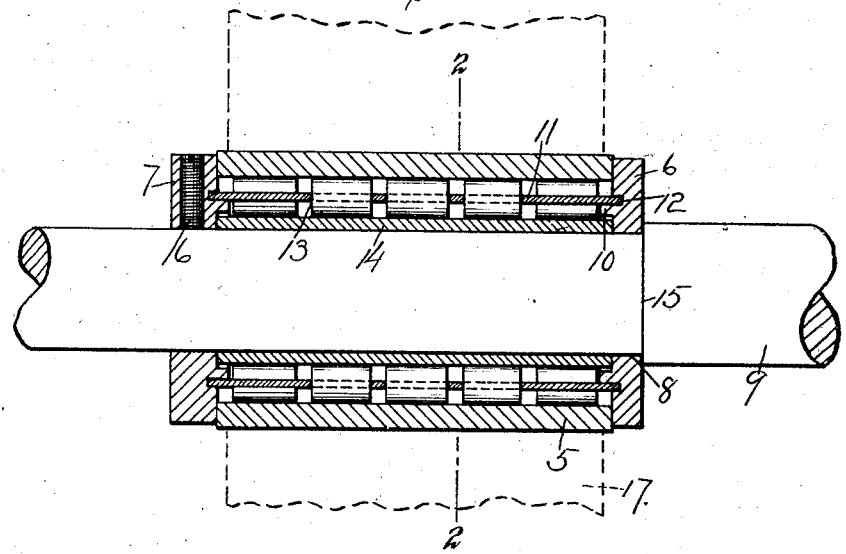
Figure 1 is a view in central lengthwise section through my improved bearing showing a shaft mounted therein.
Figure 2:
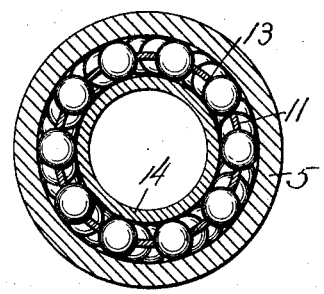
Figure 2 is a view in cross-section on the plane denoted by the dotted line 2—2 of Figure 1.
Figure 3:
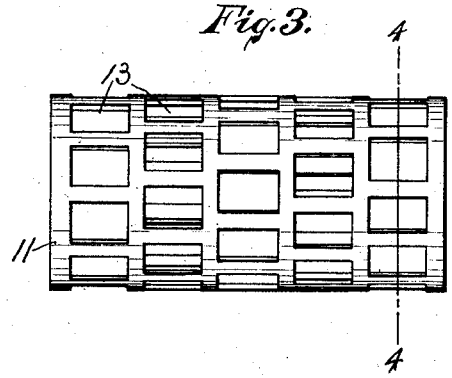
Figure 3 is a side view of the separator or cage employed for holding the rolling elements apart.
Figure 4:
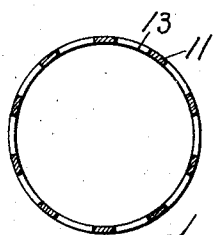
Figure 4 is a view in cross-section through said cage on a plane denoted by the dotted line 4—4 of Figure 3.

It is a purpose of my present invention to so simplify the construction of anti-friction bearings of the form commonly known as ball or roller bearings that a particularly efficient bearing may be attained at a minimum cost, and to this end my improved bearing comprises a case or shell 5 that is composed of any suitable metal, as steel, and that is, and that has, as to its inner surface at least, a hardened structure. This shell may be produced in any desired manner and it is cylindrical in form with its opposite ends formed on planes extending at right angles to the axis of said case.

The case is provided with ends 6—7 that are in the form of disks, each having a central opening 8 for the reception of a shaft 9 or other body, in connection with which the bearing is used. Each of the ends 6—7 is provided with an annular rib formed on those surfaces facing each other when the bearing is in place, said ribs comprising supports forming a separator or cage 11, and each of said ends is also provided with an annular groove 12 into which the ends of the separator or cage project. The ribs 10 afford a support for the separator or cage and the grooves 12 prevent radial movement of the cage, thereby retaining said cage in its proper position within the case or shell. The ribs 10 and grooves 12 to a certain extent supplement each other in function, and I therefore contemplate that they may be employed together, as illustrated in the drawings herein, or either may be used without the other and produce satisfactory results under some conditions of use.

The separator or cage 11 is constructed from a seamless tube of very thin metal, of any suitable kind, and which is hardened to withstand the wear in use. It is of advantage, in this connection, that this separator or cage shall be comparatively very thin, and hence a requirement for the supporting ribs 10 and the retaining grooves 12. The cage has openings 13 disposed in several circumferential rows, there being several of these rows between the ends of the cage, and the openings in each row may be disposed in any desired manner with respect to the openings in the other rows.

A bushing 14 is fitted between the ends 6—7, this bushing having a central opening to fit the shaft 9 or similar body, and the bushing also fits preferably within the recess formed by the ribs 10.

Any suitable means for securing the ends 6—7 in place may be employed.

From the foregoing description it will be noted that the bearing as a whole is slipped into position by a movement longitudinally of the shaft until it rests with the end 6 against a shoulder 15 on the shaft. The end 7 is then secured to the shaft as by means of a set screw 16, the parts being otherwise loosely connected. The bearing as a whole is supported as upon a bracket or other support 17.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. An anti-friction bearing comprising a case, ends removably attached to the case, means upon said ends and extending laterally of the plane thereof to engage a separator and prevent lateral movement thereof, a separator formed of a very thin piece of seamless tubing shaped to fit upon and receive and inclose said engaging means and having openings arranged in circumferential rows for anti-friction members, anti-friction members located in said openings and means for retaining said anti-friction members in place.

2. An anti-friction bearing comprising a case, ends removably attached to the case, annular ribs upon said ends forming a continuous annular support, a separator formed from a very thin piece of seamless tubing shaped to fit upon and receive and inclose said engaging means with its ends forming a continuous annular band fitted to said ribs to be supported thereby, said separator having openings, anti-friction members located in said openings, and means for retaining the anti-friction members in place.

3. An anti-friction bearing comprising a case, ends removably attached to the case, a continuous annular groove formed in each of said ends, a separator formed from a piece of seamless tubing with its ends fitted to engage within said grooves, said separator having openings, anti-friction members within said openings, and means for retaining said anti-friction members in place.

4. An anti-friction bearing comprising a case, ends removably attached to the case, a continuous annular groove formed in each of said ends, a continuous annular rib upon each of said ends with its outer edge flush with the inner wall of said groove, a separator formed of a very thin piece of seamless tubing shaped to fit upon and receive and inclose said rib and to fit within said groove and having openings in its wall, anti-friction members located in said openings, and means for retaining said anti-friction members in place.

WALTER BLAKE.